US009809398B1

(12) United States Patent  
Crosby

(10) Patent No.: US 9,809,398 B1  
(45) Date of Patent: Nov. 7, 2017

(54) END EFFECTOR

(71) Applicant: Propack Processing and Packaging Systems, Inc., Beamsville (CA)

(72) Inventor: Kevin George Crosby, Beamsville (CA)

(73) Assignee: PROPACK PROCESSING AND PACKAGING SYSTEMS, INC. (CA)

( * ) Notice: Subject to any disclaimer, the term of this patent is extended or adjusted under 35 U.S.C. 154(b) by 0 days.

(21) Appl. No.: 15/642,230

(22) Filed: Jul. 5, 2017

Related U.S. Application Data

(63) Continuation of application No. 15/058,066, filed on Mar. 1, 2016, now Pat. No. 9,731,913, which is a continuation of application No. 14/741,312, filed on Jun. 16, 2015, now Pat. No. 9,296,112, which is a (Continued)

(51) Int. Cl.
| | |
|---|---|
| *A47B 97/00* | (2006.01) |
| *B66C 1/02* | (2006.01) |
| *B65G 47/91* | (2006.01) |
| *B25J 15/06* | (2006.01) |
| *B65B 5/08* | (2006.01) |

(Continued)

(52) U.S. Cl.  
CPC ........ *B65G 47/918* (2013.01); *B25J 15/0061* (2013.01); *B25J 15/0616* (2013.01); *B65B 5/08* (2013.01); *B65B 35/38* (2013.01); *Y10S 901/40* (2013.01)

(58) Field of Classification Search  
CPC . B65G 47/918; B25J 15/0616; B25J 15/0061; B66B 5/08; Y10S 901/40; B65B 35/38  
See application file for complete search history.

(56) References Cited

U.S. PATENT DOCUMENTS

| | | |
|---|---|---|
| 2,903,290 A | 9/1959 | Morris et al. |
| 3,062,578 A | 11/1962 | Bushong |
| 3,186,751 A | 6/1965 | Dardaine |

(Continued)

FOREIGN PATENT DOCUMENTS

| | | |
|---|---|---|
| DE | 19831181 C1 | 3/2000 |
| EP | 0369838 A1 | 5/1990 |

(Continued)

OTHER PUBLICATIONS

Demaurex: Nomenclature, Assembly Drawings and Wiring Diagrams, Demaurex S.A Nomeclatures.doc Rev Jan. 2000, in French language including an English translation (10pages).

*Primary Examiner* — Stephen A Vu  
(74) *Attorney, Agent, or Firm* — Vista IP Law Group LLP

(57) ABSTRACT

An end effector for the packaging industry comprises has a frame, a bridge on top of the frame, a rack and pinion assembly, actuation rods, carrier assemblies, and vacuum ports. The rack and pinion assembly is configured to be operatively connected to a robot's rotatable shaft, and to the actuation rods. The actuation rods are fixedly connected to one or more of the carrier assemblies. As the robot's shaft rotates, the rack and pinion assembly is actuated, which actuates the actuation rods, which causes the carrier assemblies fixedly connected to the actuation rods to move longitudinally along the frame. Each carrier assembly includes a carrier block and at least one pick-up member. Each carrier block has at least one arm with a grabber to cooperate with an adjacent arm with grabbers of an adjacent carrier block(s) of the same subgroup.

20 Claims, 13 Drawing Sheets

Related U.S. Application Data continuation of application No. 14/536,653, filed on Nov. 9, 2014, now Pat. No. 9,073,222.

(60) Provisional application No. 61/904,418, filed on Nov. 14, 2013.

(51) Int. Cl.
*B25J 15/00* (2006.01)
*B65B 35/38* (2006.01)

(56) References Cited

U.S. PATENT DOCUMENTS

| | | | |
|---|---|---|---|
| 3,230,001 A | 1/1966 | Hirt | |
| 3,300,945 A | 1/1967 | Grossi et al. | |
| 3,318,068 A | 5/1967 | Voullaire | |
| 3,506,140 A | 4/1970 | Koch et al. | |
| 3,542,224 A | 11/1970 | Warren | |
| 3,542,412 A | 11/1970 | Koch et al. | |
| 3,685,624 A | 8/1972 | Paddock | |
| 3,831,992 A | 8/1974 | Francois | |
| 3,908,812 A | 9/1975 | Graff | |
| 3,920,128 A | 11/1975 | Baker | |
| 3,929,234 A | 12/1975 | Warren | |
| 4,199,050 A | 4/1980 | Moller | |
| 4,340,247 A | 7/1982 | Schnier | |
| 4,411,574 A | 10/1983 | Riley | |
| 4,789,292 A | 12/1988 | Holcomb | |
| 4,832,180 A | 5/1989 | Ferrero | |
| 4,901,504 A | 2/1990 | Tsuji et al. | |
| 4,957,406 A | 9/1990 | Akagawa | |
| 4,968,240 A | 11/1990 | Binacchi | |
| 5,275,451 A | 1/1994 | DeJohn | |
| 5,345,831 A | 9/1994 | Sandrock | |
| 5,575,376 A | 11/1996 | Colamussi | |
| 5,630,311 A | 5/1997 | Flix | |
| 5,706,634 A | 1/1998 | Edwards et al. | |
| 5,931,279 A | 8/1999 | Pedrotto et al. | |
| 6,068,317 A | 5/2000 | Park | |
| 6,439,631 B1 | 8/2002 | Kress | |
| 6,589,008 B1 | 7/2003 | Ingraham | |
| 6,766,711 B2 | 7/2004 | Hvittfeldt et al. | |
| 7,023,197 B2 | 4/2006 | Jung | |
| 7,188,544 B2 | 3/2007 | Persson et al. | |
| 7,390,040 B2 | 6/2008 | Subotincic | |
| 7,954,869 B2 | 6/2011 | Shim et al. | |
| 8,534,727 B2 | 9/2013 | Weclawski et al. | |
| 2014/0195053 A1 | 7/2014 | Subotincic | |

FOREIGN PATENT DOCUMENTS

| | | |
|---|---|---|
| EP | 0644120 A1 | 3/1995 |
| WO | WO98/08758 A1 | 3/1998 |

END EFFECTOR

CROSS-REFERENCE TO RELATED APPLICATIONS

This application is a continuation of U.S. patent application Ser. No. 15/058,066 filed Mar. 1, 2016, issued on Aug. 15, 2017 as U.S. Pat. No. 9,731,913, which is a continuation of U.S. patent application Ser. No. 14/741,312, filed Jun. 16, 2015, issued Mar. 29, 2016 as U.S. Pat. No. 9,296,112, which is a continuation of U.S. patent application Ser. No. 14/536,653, filed Nov. 9, 2014, issued Jul. 7, 2015 as U.S. Pat. No. 9,073,022, which claims the benefit of U.S. provisional Application No. 61/904,418, filed on Nov. 14, 2013. The contents of the aforementioned application(s) are hereby incorporated herein by reference in their entirety as if set forth fully herein. Priority to, and/or the benefit of, each of the aforementioned applications is hereby expressly claimed in accordance with 35 U.S.C. §§119, 120, 365, 371 and/or any other applicable statutes.

BACKGROUND

The field of the invention generally relates to end effectors for picking and placing objects, and are typically used with robotic arms for picking up items off a conveyor belt and placing them in bulk packaging.

End effectors, also known as end-of-arm tools, in general are well-known in the art. In the packaging industry, an end effector is typically attached to the end of a robotic arm from a robot such as a Delta Robot. The robot controls the robot arm, which in turn controls movement of the end effector. The robot further includes a rotatable shaft to actuate an actuation mechanism of the end effector, to control movement of individual carrier assemblies. This is done typically to retrieve (pick) items (e.g., candy bars or other food items) from a first conveyor belt, and deliver (place) them into containers such as boxes on a second conveyor belt for retail distribution.

A typical end effector has carrier assemblies that each include a carrier block either fixed to the frame of the end effector, or slidingly engaged to the frame, with one or more pick-up members (typically suction cups) attached thereto and operatively connected to a vacuum source. The quantity and arrangement of the pick-up members may vary depending on the application. For example, an end effector designed to pick up two rows of 8 items each at a first diverged pitch, then place them into packaging in groups of 4 at a second pitch, is referred to herein as a 4×4, 4 by 4, or 4-4, since each side of the end effector would converge the items into 2 groups of 4 in preparation for placing them into the packaging, resulting in groups on each side of 4 and 4.

A first set of parameters associated with the items on the first conveyor belt are determined, such as their shape, dimensions, configuration, orientation, distance between each item, and distance between each group of items, and the first conveyor belt moves at a known speed. These parameters may be preset, programmed, and/or adjusted as needed. Likewise, the packages that receive the items are on a second conveyor belt, with a known second set of parameters that may differ from the first set of parameters. The end effectors are typically custom-designed to accommodate the parameters for a specific application. In this manner, the robot and end effector may be programmed and designed to pick up items at a first pitch and place them into packaging at a second pitch as required.

In order for the pick-up members to pick up items at a first pitch, and place them into a package at a second pitch, the pick-up members must be moveable. Various end effector designs are known for doing so. For example, some earlier successful designs, such as those manufactured by Demaurex, connect (via a connector) to the robot arm, and also have a spindle operatively connected to a rotatable shaft of the robot. The end of the shaft attached to the end effector is attached to a rotary rack and pinion actuation mechanism associated with the end effector, with arms extending out from the pinion attached to carrier blocks on either side of the end effector. As the robot rotates the shaft, the pinion thus rotates, causing the arms to move accordingly, which in turn causes the carrier blocks with the pick-up members to move longitudinally along the body of the end effector. FIGS. 12-13 are selected pages of a Demaurex manual from the year 2000, illustrating several views of the Demaurex end effector with the connector, rack, and pinion annotated. In the Demaurex device, the pick-up members are all directly connected to the arms, and thus move in synch with the arms.

Another known design uses a rotary cam and cam blocks instead of a rack and pinion. See, e.g., U.S. Pat. No. 7,390,040 (Subotincic), the contents of which are incorporated herein by reference. Subotincic describes having only certain pick up members directly connected to the actuation mechanism. Other pick up members are indirectly connected to the actuation mechanism, and are moved by the directly-connected pick-up members by way of tie links. The tie links are small plastic pieces often dangling (not fixed) from the bottom of the end effector and move at high speeds. Also, access to the rotary mechanism is difficult in the Subotincic design, making installation, repair, and maintenance challenging at times.

SUMMARY

In one embodiment, the present invention is directed to an end effector comprising a frame, a bridge, a rack assembly, a pinion assembly, and a spindle assembly (collectively, the rack assembly, pinion assembly and spindle assembly referred to as a rack and pinion assembly), actuation rods, carrier assemblies, and vacuum ports. The rack and pinion assembly has a robot interface configured to be operatively connected to a robot's rotatable shaft, and an actuation interface operatively coupled to the actuation rods. The actuation rods are fixedly connected to one or more of the carrier assemblies. Thus, as the robot's shaft rotates about its axis, the rack and pinion assembly is actuated, which in turn actuates the actuation rods, which causes the carrier assemblies fixedly connected to the actuation rods to move longitudinally along the frame.

In one aspect of the present invention, less than all of the carrier assemblies are directly connected to the actuation rods. The carrier assemblies directly connected to the actuation rods are referred to as "directly connected" carrier assemblies and the carrier assemblies not directly connected to the actuation rods are referred to as "non-connected" carrier assemblies or "indirectly connected" carrier assemblies. Cooperating members on each of the carrier assemblies are used to couple the non-connected carrier assemblies to the directly connected carrier assemblies such that the movement of the directly connected carrier assemblies causes movement of the non-connected carrier assemblies. In one embodiment, the cooperating members are arms having grabbers. Each carrier assembly includes a carrier block and at least one pick-up member. Each carrier block has one or more arms extending towards an adjacent carrier assembly. Each arm has a grabber to cooperate with the grabber of the adjacent carrier block of the same subgroup, wherein during movement in the direction of divergence of the carrier assemblies the adjacent grabbers move into contact with each other and the grabbers engage such that first carrier assembly of the adjacent carrier assemblies pulls the other carrier assembly in the direction of movement of the first carrier assembly until at their full travel they lock into position at full divergence. During movement in the direction of convergence of the carrier assemblies, the grabbers disengage and glide along the surface of their adjacent arms and/or through slots in the openings of the adjacent carrier blocks until full convergence is achieved. At full convergence, the carrier blocks typically abut, either by side walls or by detents or tabs, such that movement of a first carrier assembly of the adjacent carrier assemblies pushes the other carrier assembly in the direction of movement of the first carrier assembly. Thus as the carrier assemblies fixedly connected to the actuation rods move longitudinally along the frame, adjacent carrier members in the same subgroup are moved as described herein.

In additional aspects of the present invention, the rack assembly may comprise rack rails fixedly mounted to the bridge with each rack rail having a rack slidingly engaged with the rack rail. The end effector may also include a robot interface in the form of a connector plate configured to be couple the end effector to a robot. The end effector may also include one or more vacuum ports for connecting the end effector to a vacuum source for applying a vacuum to the pick-up members of each of the carrier assemblies.

DETAILED DESCRIPTION

Figure 1:
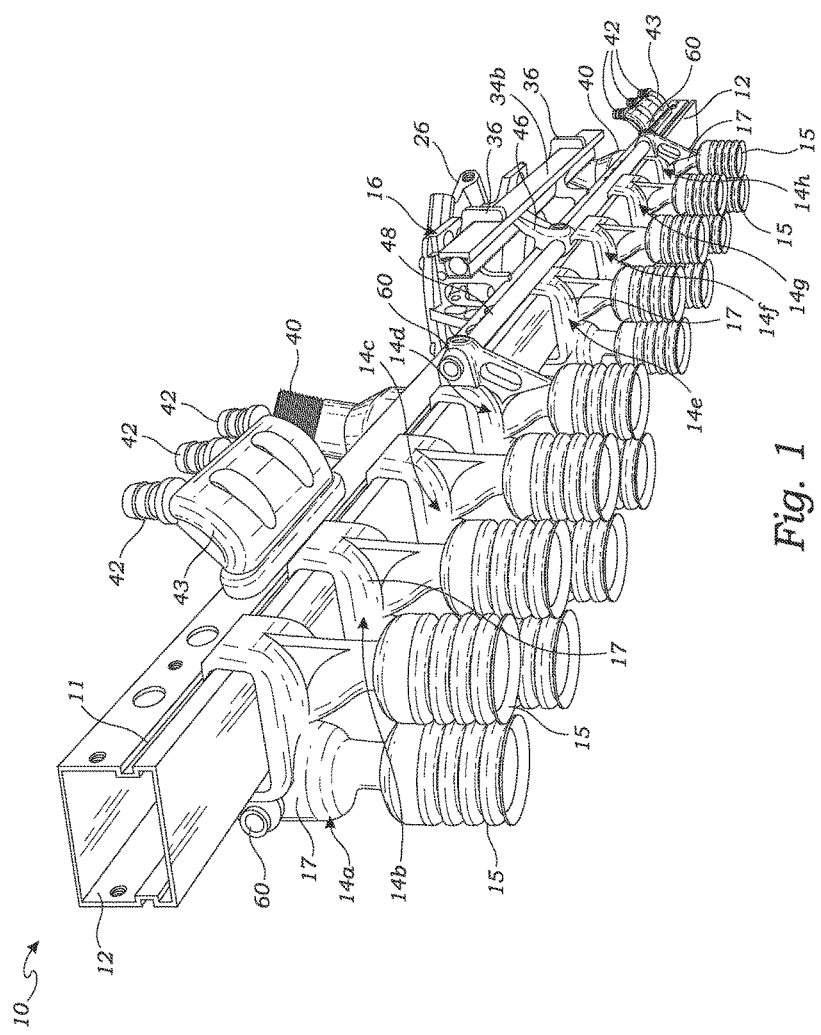
FIG. 1 is a bottom perspective view of an end effector with the carrier assemblies in a diverged position, according to one embodiment of the present invention.

The present invention comprises an end effector comprising a rack and pinion assembly having a robot interface configured to be operatively connected to the robot's rotatable shaft at one end, and an actuation interface configured to operatively connect to actuation rods at the other end. The actuation rods are fixedly connected to one or more carrier assemblies, such that the carrier assemblies move in synch therewith. Other carrier assemblies may be indirectly connected to an actuation rod, (i.e., they move not in synch therewith), or fixed to a frame of the end effector. The carrier assemblies each have at least one pick-up member configured to pick-up an object, such as by using a controllable vacuum to grasp an object, and then place the object, such as by releasing the vacuum. The carrier assemblies are movable relative to the overall end effector so that the carrier assemblies can be arranged to in a first pattern (e.g. pitch or spacing) pick-up a plurality of objects in the first pattern (e.g. pitch or spacing), and then be moved to a second pattern (e.g. pitch or spacing) to place the plurality of objects in the second pattern. Typically, the entire end effector is also moved by a robot between a first location to pick-up the objects and a second location different from the first location to place the plurality of objects.

Referring to FIGS. 1-8, one embodiment of an end effector 10 according to the present invention is shown. The end effector 10 comprises a frame 12 to which a plurality of carrier members 14 are slidingly (or otherwise movably) engaged to frame 12. The frame 12 may be constructed from a lightweight aluminum or other metal, or other suitable material such as carbon fiber composites, fiberglass, etc. In this described embodiment, the frame 12 is an elongate, hollow tube having a substantially rectangular cross-section. The hollow tube structure forms an air flow passageway through the frame which allows the frame 12 to also function as a manifold and conduit for the vacuum air flow between a vacuum source, and the various vacuum ports and other vacuum manifolds on the end effector 10, as described below. The external surface of the frame 12 has a frame groove 11 to slidingly engage a frame guide 66 of each of the carrier assemblies 14 to slidingly couple the carrier assemblies 14 to the frame 12.

A bridge assembly 16 is attached to a top surface of the frame 12. The bridge assembly may be a single, integral structure, or as is shown in this exemplary embodiment, an assembly of multiple pieces connected together. The bridge assembly 16 may be constructed of any of the same materials as the frame 12, as described above. As better shown in FIGS. 3-4, the bridge assembly 16 is comprised of a flat top plate 18, and two side supports 20 connected to the top piece at opposing ends of the top piece 18. The side supports 20 each include a vertical support 22 and a lateral support 24 to provide structural integrity. The top plate 18 and side supports 20 may have holes in their surfaces to reduce weight while not compromising structural integrity.

The bridge assembly 16 is attached to the frame at multiple stress points using any suitable fastening device, such as screws, rivets, hex-bolts, bolts, welding, or other suitable means, thereby providing vertical support and lateral support to the connection between a connector plate 26 of a robot (now shown) and the end effector 10. The connector plate 26 may be bolted to machined screw holes in the top plate 18 of the bridge assembly 16 using the bolts 28. This provides the structural strength required during high-speed operation of the end effector 10.

The bridge assembly 16 has an opening 32 (see FIG. 10) in the top plate 18 to allow a spindle assembly 52 of a rack and pinion assembly 50 to pass vertically through the opening 32. The opening 32 may be substantially circular, or have at least a semi-circular portion. As described in more detail below, the spindle assembly 52 couples a pinion assembly 54 to the robot's rotatable shaft thereby transferring rotation of the robot's rotatable shaft to rotate the pinion assembly 54. The bridge assembly 16 also has an access opening 30 in the form of a frontal cutout 30 in the top plate 18 configured to allow the spindle assembly 52 to pass horizontally through the access opening 30, typically while still attached to the pinion assembly 54. The access opening 30 allows easy access for installation, repair and maintenance of the rack and pinion assembly 50 without having to further disassemble the end effector 10. The access opening 30 is wide enough to allow the spindle assembly 52 (which is typically cylindrical) to pass through the access opening, and still provide some leeway for manual installation and removal of the spindle assembly 52.

The bridge assembly 16 has a plurality of rail supports 36 (also referred to as rail braces) for securing rack rails 38 in place, one on the front side and one on the back side of the bridge assembly 16. The rail supports 36 may be formed as part of the side supports 20, as shown in the exemplary embodiment, or they may be separate parts fastened to the bridge assembly 16. The rack rails 38 may be attached to the rail supports 36 using any suitable fastening means, such as screws, bolts, rivets, press-fitting, welding, etc.

The bridge assembly 16 houses the pinion assembly 54. The access opening 30 and the height of the top plate 18 above the frame 12 are configured to provide sufficient space to allow the pinion assembly 54 and spindle assembly 52 to be installed and removed through this space without further disassembly of the end effector or separating the pinion assembly 54 from the spindle assembly 52.

The end effector 10 may also include various vacuum ports located at strategic positions on the frame 12 to connect an air vacuum source to the end effector 10 and to connect each of the carrier assemblies 14 to the vacuum air flow. A pair of input vacuum ports 40 are mounted on a top surface of the frame 12, one towards each end of the elongate frame 12. The input vacuum ports 40 are mounted on the frame 12 over an opening into the frame 12 such that input vacuum ports 40 are in fluid communication with the passageway in the frame 12. The input vacuum ports 40 are configured to be connected to a vacuum source, such as vacuum source tubing connected to a vacuum source, for providing a vacuum air flow to the end effector 10. A plurality of distribution vacuum ports 42 are mounted at spaced locations on a side surface of the frame 12, such as a group of three distributions vacuum ports 42 at each end of the frame 12. The groups of distribution vacuum ports 42 may be integrally formed into a distribution vacuum manifold with ports 43, as shown in the exemplary embodiment, or they may be separate structures. Each distribution vacuum port 42 is configured to be connected via tubing (not shown) to a carrier vacuum port 44 on the carrier assemblies 14. Accordingly, an overall vacuum air flow path through the end effector 10 is formed, commencing at the pick-up members 15, into the carrier blocks 17 and out of the carrier vacuum port 44, then through the tubing to the distribution vacuum ports 42/43, then into and through the passageway in the frame 12, then through the input vacuum ports 40, and finally through the source tubing to the vacuum source. The vacuum ports 40 and 42 may be formed of any suitable material, such as polymers, nylon, plastic, composites, etc. The vacuum ports 40 and 42 may be of varying sizes, configurations, interfaces, and orientations, and they may have multiple connections connected through a single part and/or manifold. For instance, the input vacuum ports 40 may be ¾ inch ports, and the distribution ports 42 may have multiple (such as three) ¼ inch ports. The carrier vacuum ports 44 are preferably the same size as the distribution ports 42 (in this example, ¼ inch ports) so that the same size tubing can connect between them.

Figure 9:
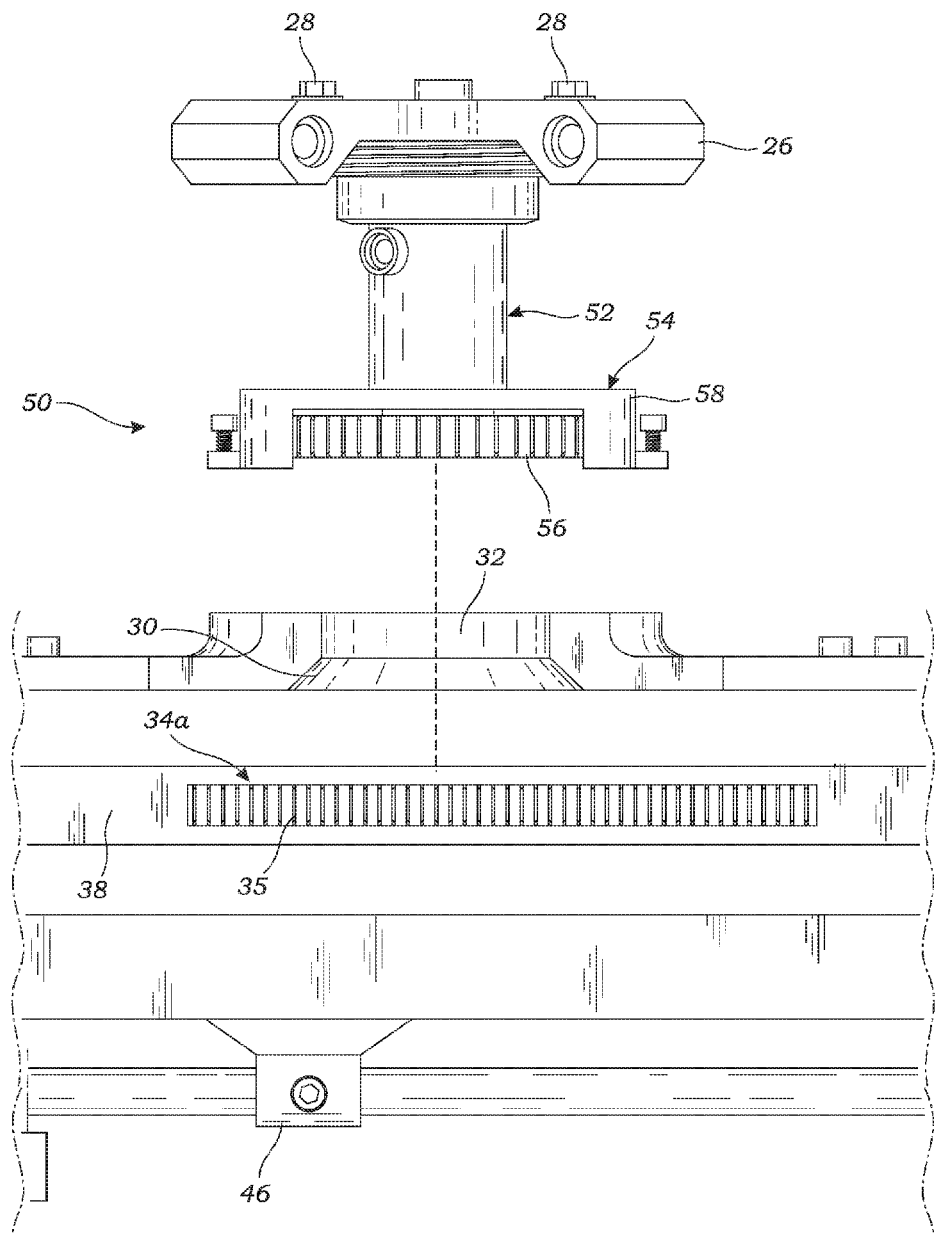
FIG. 9 is an enlarged partial, exploded, side view of the end effector of FIG. 1, according to one embodiment of the present invention.
Figure 10:
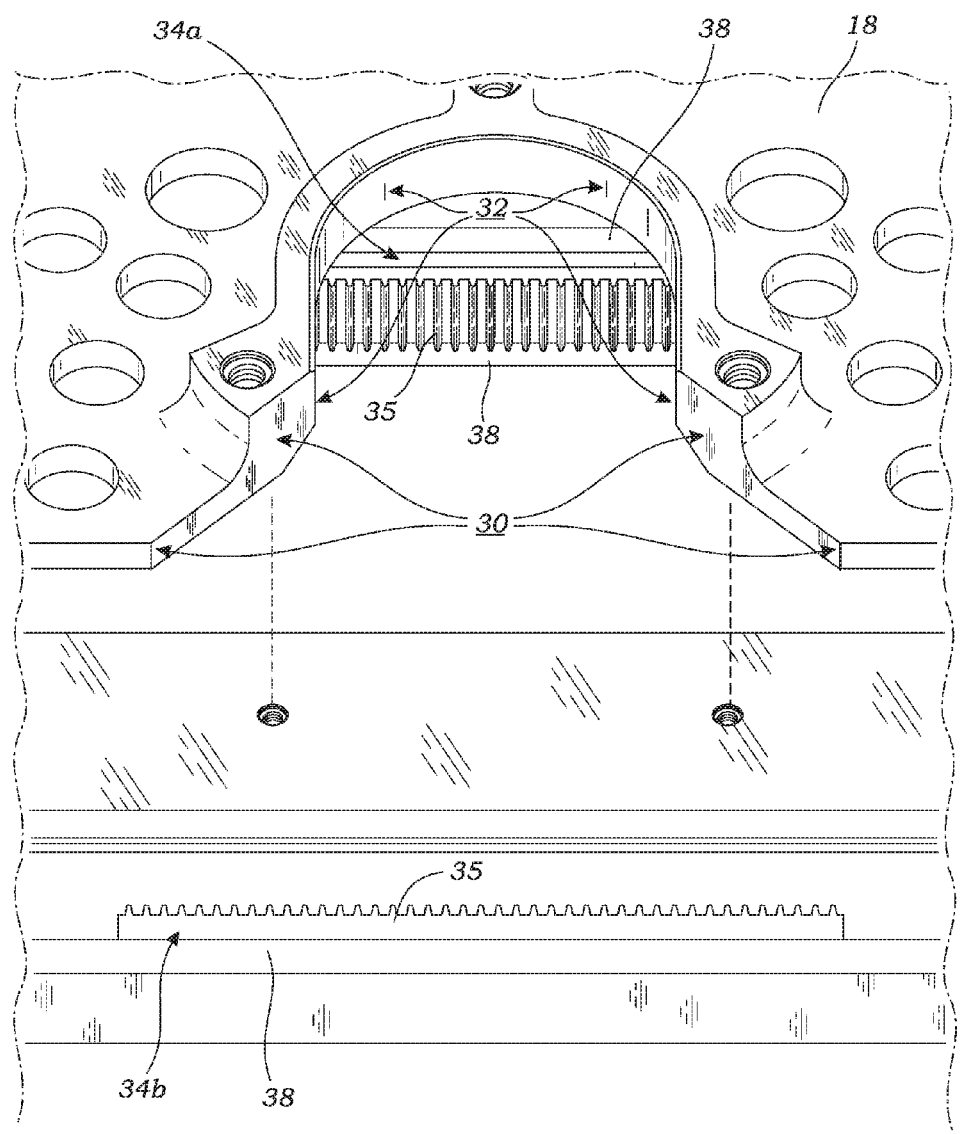
FIG. 10 is an enlarged partial, exploded, side perspective view of the end effector of FIG. 1, according to one embodiment of the present invention.
Figure 11:
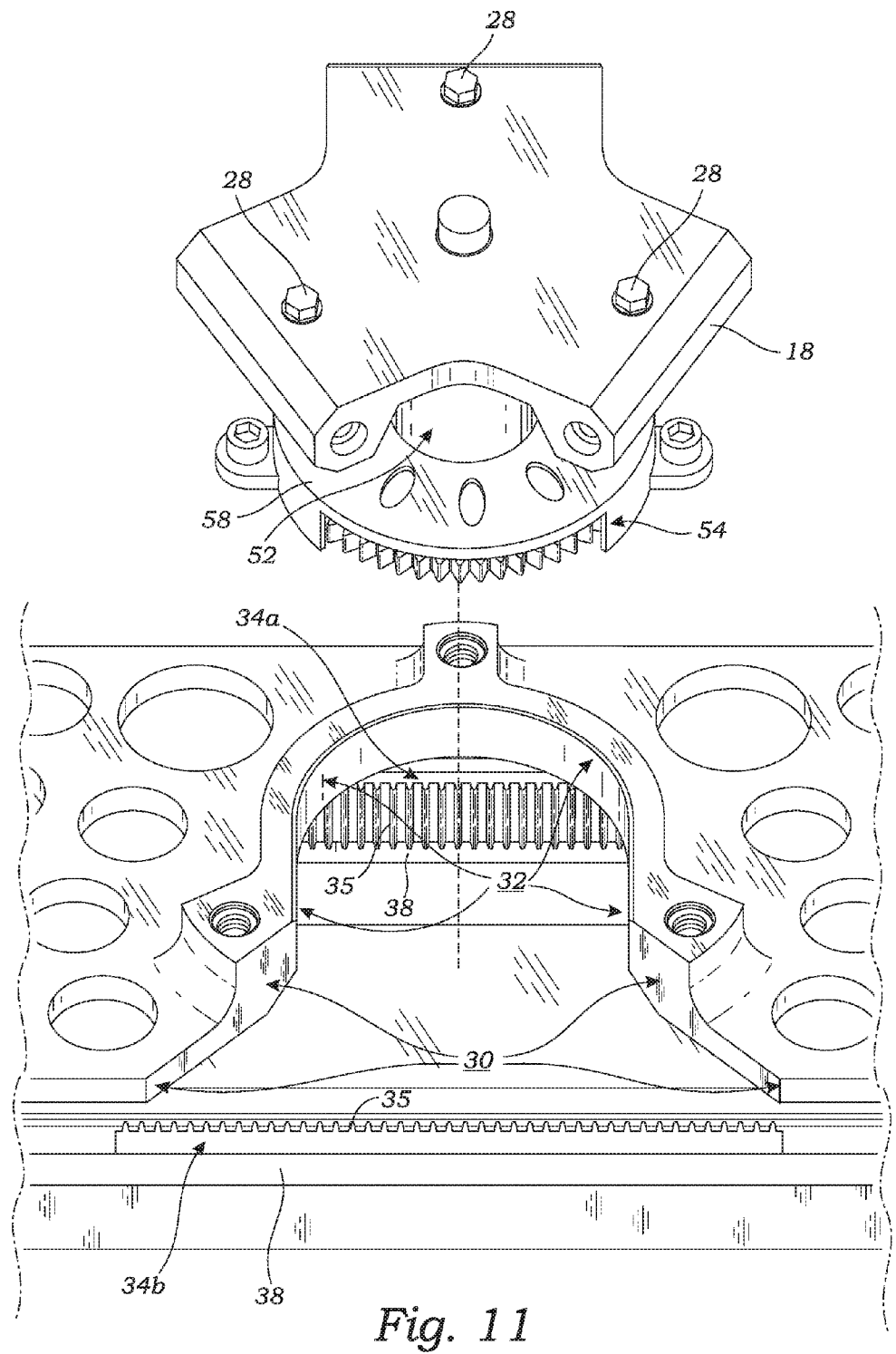
FIG. 11 is an enlarged, partial, perspective side view of the end effector of FIG. 1 showing the pinion assembly removed, according to one embodiment of the present invention; according.

Turning to FIGS. 9-11, the rack and pinion assembly 50 includes a pinion assembly 54 and a mating rack assembly. Referring also to FIGS. 1-5, the rack assembly includes the left side rack assembly 34a and the right side rack assembly 34b. Each rack assembly 34 includes a rack rail 38 and a corresponding rack 35 slidingly coupled to the rack rail 38. Each rack rail 38 is fixedly attached to the corresponding rail supports 36 of the bridge assembly 16. Each rack 35 has an elongated portion with vertically aligned teeth along its inside surface (surface facing the pinion 56) and a substantially smooth outside surface (surface facing and engaging the rack rail 38). The outside surface of each rack 35 is slidingly coupled to its corresponding rack rail 38, using any suitable means. For example, nylon or other lightweight spacer may be extruded and attached to the outside surface of the rack 35, to slide within a mating extruded or machined slot in the inside surface (the surface facing the rack 35) of rack rail 38. The spacers may be attached to the racks 35 by any suitable means, such as screws, bolts, rivets, glue, etc.

Each rack 35 has at least one rack brace 46 extending downward from the bottom of the rack 35 and having a mounting sleeve fixedly attaching the rack brace 46 to a corresponding actuation rod 48, with one actuation rod 48 for each rack 35. The actuation rod 48 fits into the mounting sleeve and a set screw is used to fix the mounting sleeve in place on the actuation rod 48. The rack brace 46 may be integrally molded as part of the rack 35, or it may be a separate part attached to the rack 35, such as by a press fit, bonding, fasteners, or other suitable means of attachment to the rack 35.

The rack rails 38 may be constructed of aluminum or other lightweight metal, or other suitable material. Each rack rail 38 is secured in place by attachment to its corresponding rail support(s) 36 on the bridge assembly 16. The rack rails 38 may be alternatively, or additionally, secured to the frame 12.

Referring again to FIGS. 9-11, the pinion assembly 54 includes a pinion 56, a pinion cover 58, and a spindle assembly 52. The pinion 56 is a substantially circular toothed gear, with teeth arranged vertically to mate with the teeth on the racks 35. The pinion 56 may be made of any suitable material, preferably the same as that used for the racks 35. The teeth on the pinion 56 may be colored at various arcs. For example, first and second colors may be used to color the teeth (and/or upper surface of the pinion) every other x degrees (where x is 20, 25, 30, 35, 40, 45, 50, 55, 60, 65, 70, 75, 80, 85, 90, etc.), or each sector may have a unique color. This may be helpful during maintenance to allow a technician to rotate and reposition the pinion a certain amount so as to allow previously-unengaged sectors of teeth to be positioned in a manner to engage the racks 35 during operation, and likewise the previous sectors of teeth that engaged the racks 35 during operation will be rotated to non-engaging positions. This provides for more uniform wear of the pinion 56, and a longer operating life.

The pinion 56 is positioned to be rotatably engaged between the left side rack 35 (on the left rack assembly 34a) and the right side rack 35 (on the right rack assembly 34b) during operation, with teeth rotatably mating with the teeth of the racks 35. The racks 35 and pinion 56 may be made of material similar to the vacuum ports 40 and 42.

The pinion 56 may have a protective pinion cover 58, as seen in FIGS. 9 and 11, which assists in keeping the pinion 56 engaged with the racks 35 during operation. The pinion cover 56 may have top surface cutouts sufficient for venting of heat and minimizing weight, without compromising functionality, and frontal cutouts to allow visual inspection of the pinion 56 during operation of the end effector 10. The pinion cover 58 may be made of a material similar to that used for the vacuum ports 40 and 42, the carrier blocks 17, the racks 35, and/or the pinion 56.

Figure 13:
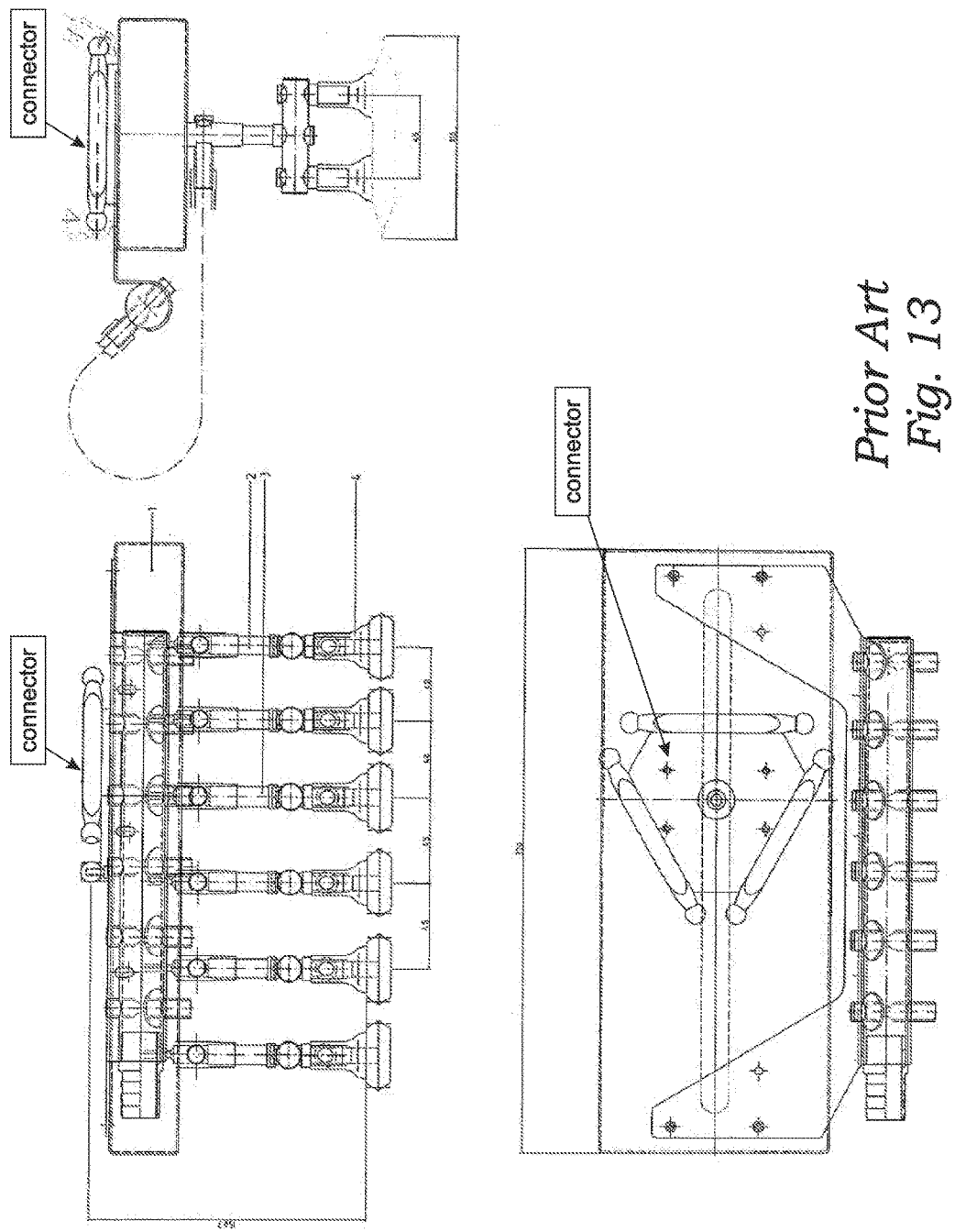
FIG. 13 illustrates several views of a subassembly of a prior art Demaraux end effector.
Figure 14:
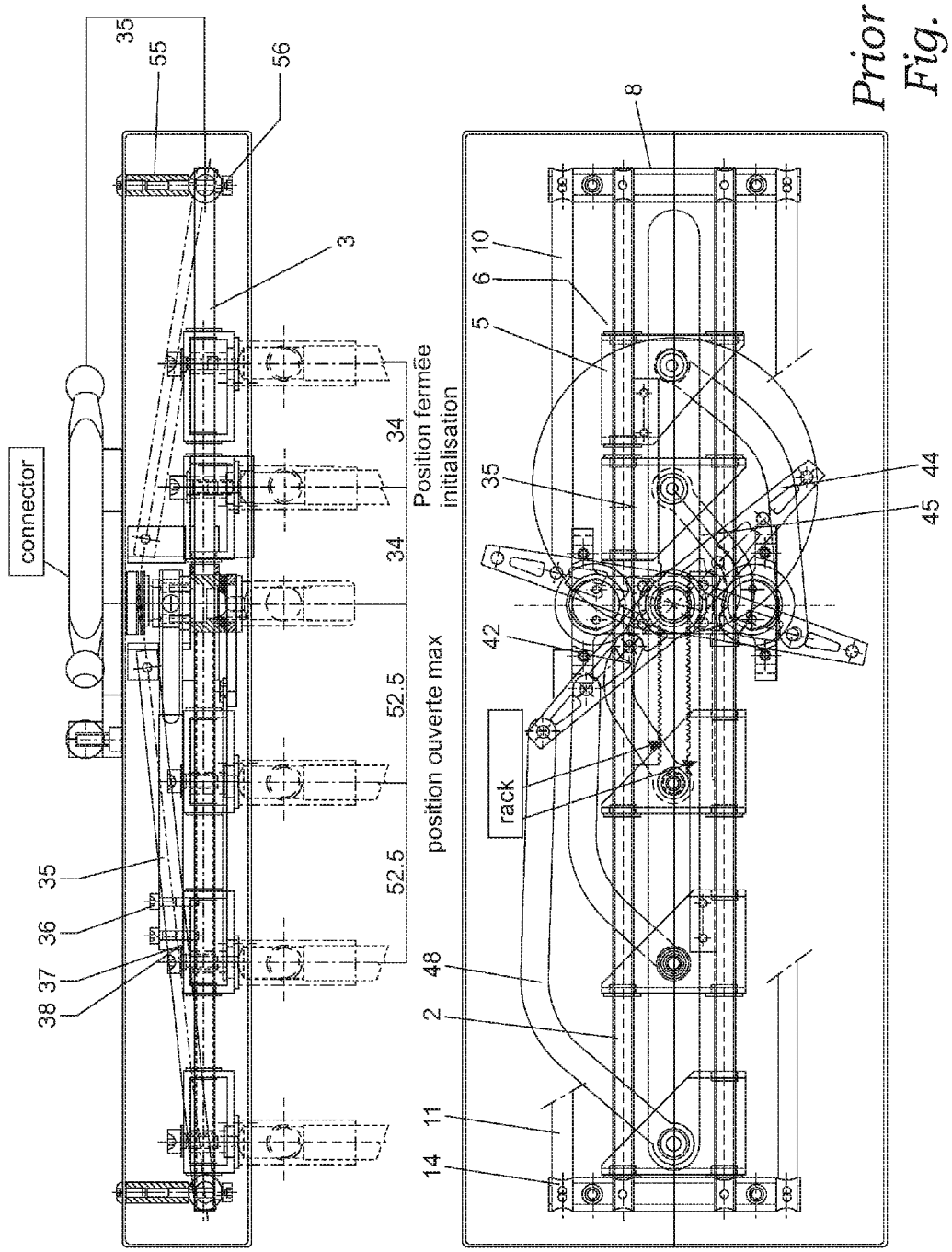
FIG. 14 illustrates several views of another subassembly of a prior art Demaraux end effector.

The rack and pinion assembly 50 functions differently than that of the Demaurex design shown in FIGS. 13 and 14, because some of the carrier assemblies 14 in the present design are not directly connected to the actuation rods 48, but instead are either fixed (e.g., bolted or riveted to the frame) or moved by grabbers 21 of adjacent carrier assemblies 14, as described in more detail below.

The spindle assembly 52 has a housing and a rotatable shaft configured to rotate within the housing. The rotating shaft has a bottom end operatively connected to the pinion 56. The top end of the rotatable shaft can be operatively connected to a mating rotatable shaft of the robot. The top end of the housing is configured to fixedly connect to the connector plate 26, for example, by threaded mating portions. The spindle assembly 52 may be custom-machined or altered from the off-the-shelf spindle typically accompanying the robot, to accommodate specific applications. Although the spindle assembly 52 is considered part of the pinion assembly 54 as described herein for convenience, it may also be considered a separate component.

Thus, the rack and pinion assembly 50 allows a rotational force applied to the rack and pinion assembly 50 through the shaft of the spindle assembly 52 to be translated into linear longitudinal motion of the racks 35 and attached actuation rods 48. Each of the actuation rods 48 is fixedly connected to one or more directly-connected carrier assemblies 14 to directly move the directly connected carrier assemblies 14 when the actuation rods 48 are actuated by the rack and pinion assembly 54. The directly-connected carrier assemblies are connected to a corresponding actuation rod 48 using a carrier mounting sleeve 60 which fixedly attaches to the actuation rod, similar to the mounting sleeve of the rack brace 46. A set screw may be used to fix the mounting sleeve 60 in place on the actuation rod 48. Accordingly, the actuation rod 48 on the left side of the end effector 10 is directly connected to, and actuates, directly-connected carrier assemblies 14a and 14e (see FIG. 4). The actuation rod on the right side of end effector 10 is directly connected to, and actuates, directly-connected carrier assembles 14d and 14h. which are directly connected to the is connected by a rack brace to the rack on its side of the end effector, to cause movement of the rod when the rack is actuated. Thus, when the robot shaft rotates the shaft of the spindle assembly 52 which rotates the pinion 56; the rotation of the pinion 56 actuates the racks 35 causing linear translation motion of the racks 35 in opposite directions (i.e. the left side rack moves in the opposite direction of the right side rack), which in turn causes linear motion of the actuation rods 48 (also in opposite directions from each other), which causes the directly connected carrier assemblies 14a, 14e, 14d and 14h to move in synch therewith (with carrier assemblies 14a and 14e moving in a first direction and carrier assemblies 14d and 14h moving in the opposite direction). The actuation rods 48 may be made of lightweight metal or other suitable material, similar to the material used for the frame 12 and bridge 16.

Figure 6:
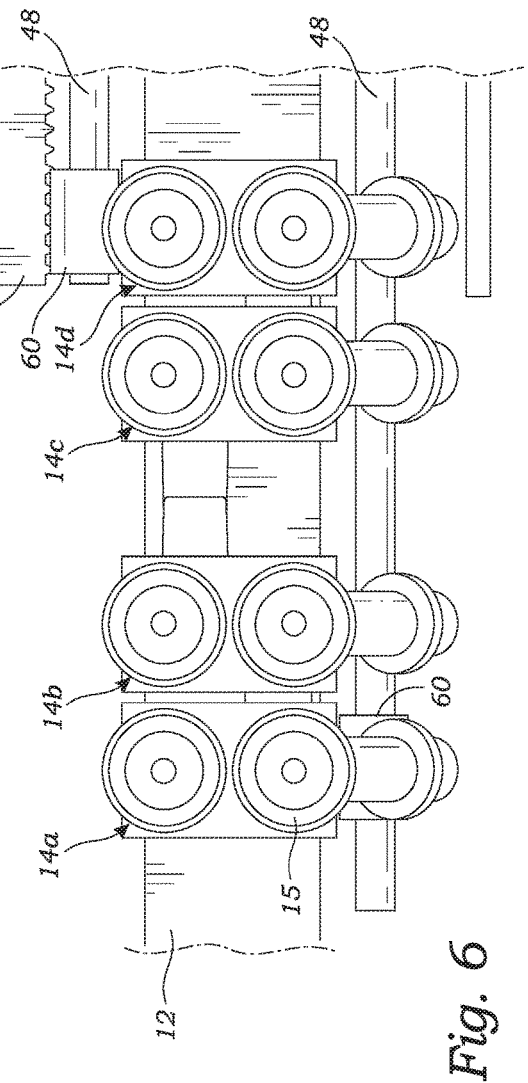
FIG. 6 is an enlarged, partial bottom view of the end effector of FIG. 1, with the carrier assemblies in a partially diverged position according, to one embodiment of the present invention.
Figure 7:
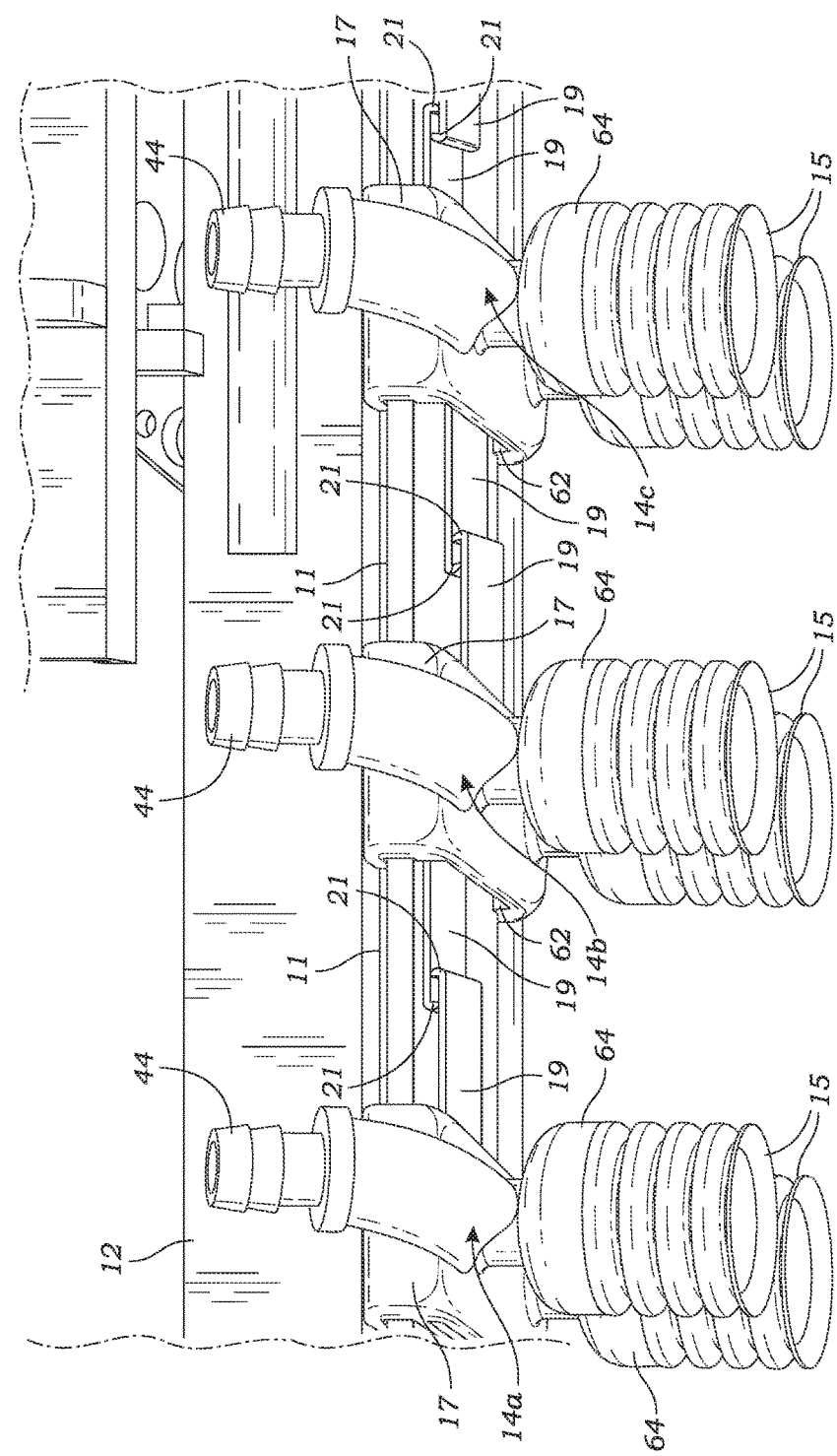
FIG. 7 is an enlarged, partial, bottom perspective view of the end effector of FIG. 1, with the carrier assemblies in a diverged position, according to one embodiment of the present invention.
Figure 8:
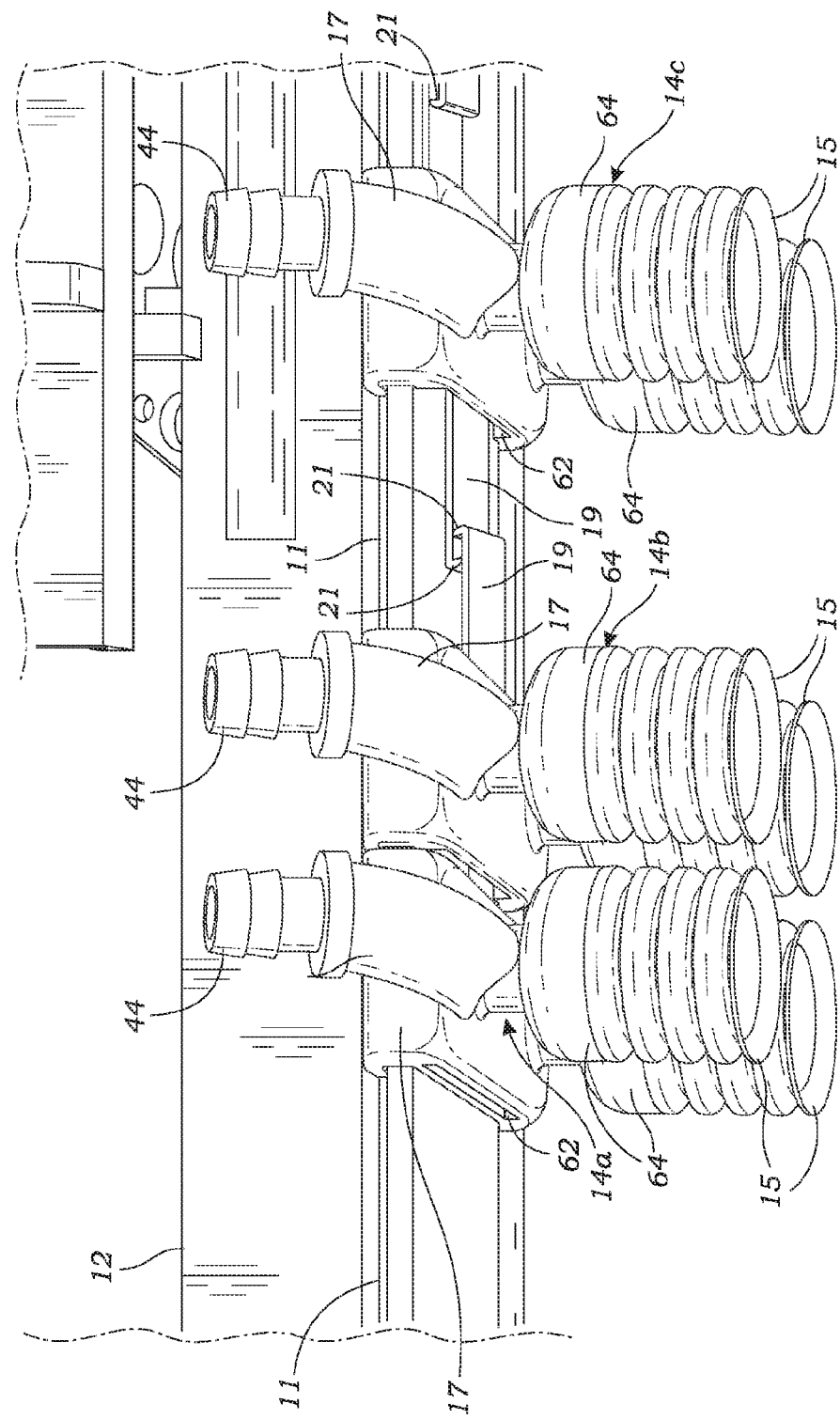
FIG. 8 is an enlarged partial, bottom perspective view of the end effector of FIG. 1, with the carrier assemblies in a partially converged position, according to one embodiment of the present invention.

Referring to FIGS. 6, 7 and 8 (and also FIGS. 1-4), each carrier assembly 14 includes a carrier block 17 and at least one pick-up member 15 attached to a pick-up housing 64 on the bottom of the carrier block 17. In the exemplary embodiment, each carrier assembly 14 includes two pick-up members 15, one for the right side of the end effector 10 and one for the left side of the end effector 10. The pick-up housing 64 includes an aperture for receiving a flanged portion of each of the pick-up members 15 to securely, and removably, attach the pick-up members 15 to the carrier block 17. Each carrier block 17 has a carrier vacuum port 44 disposed at a top end of the carrier block 17. Each carrier block 17 has an carrier block passageway providing an airflow path from each of the pick-up members 15 to the carrier vacuum port 44.

Figure 5:
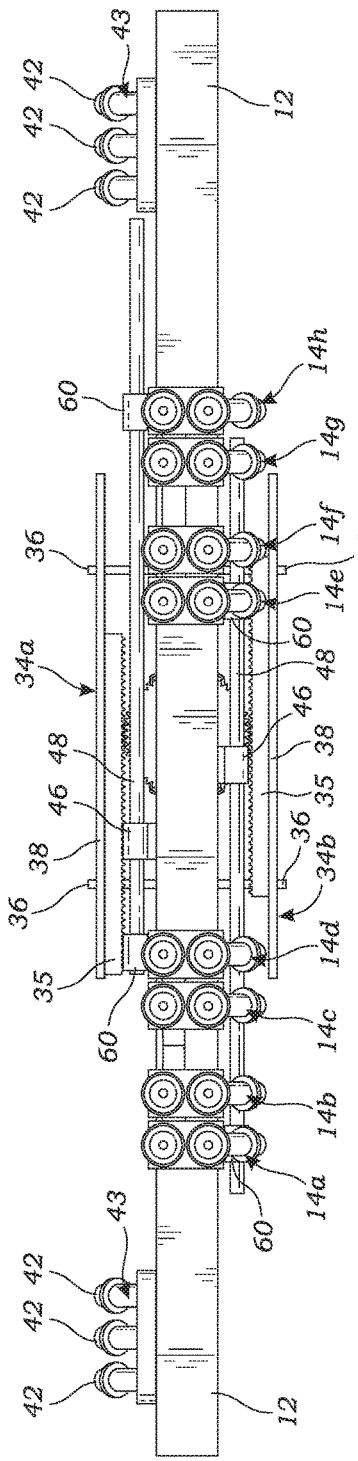
FIG. 5 is bottom view of the end effector of FIG. 1, according to one embodiment of the present invention.
Figure 12A:
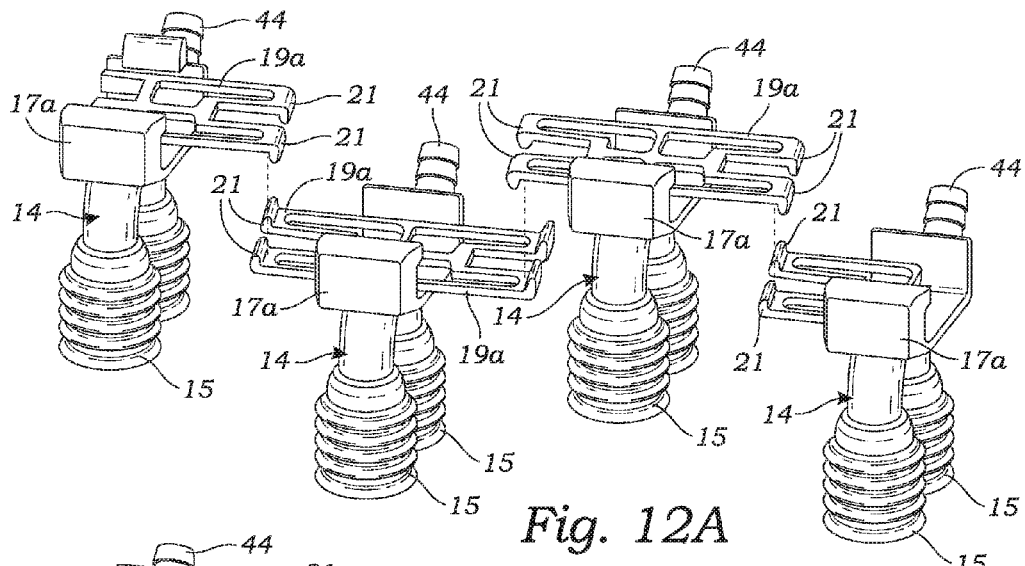
FIGS. 12A, 12B and 12C illustrate an alternative embodiment of carrier assemblies, according to another embodiment of the present invention.
Figure 12B:
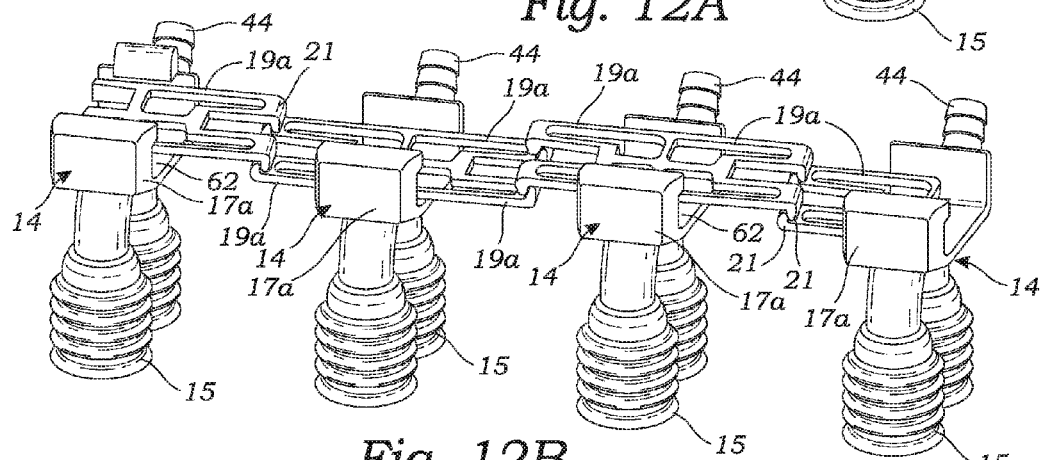
Figure 12C:
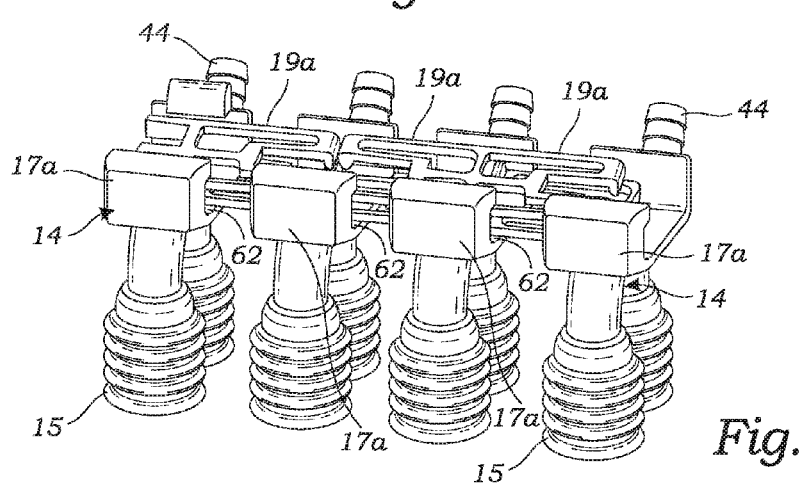

Each of the carrier blocks 17 also has at least one arm 19 having a grabber 21 (or catch) extending longitudinally toward the adjacent carrier block(s) 17. The carrier assemblies 14 of the end effector 10 are configured in subgroups which are coupled together by the arms 19 to be moved in cooperation with each other by the actuation of the actuation rods 48. For example, in the exemplary end effector 10, carrier assemblies 14a, 14b, 14c and 14 d are configured in a left subgroup (left per the orientation of FIG. 5) and carrier assemblies 14e, 14f, 14g and 14h are configured in a right subgroup (again, right per the orientation of FIG. 5). The end positioned carrier assemblies 14 (including 14a, 14d, 14e and 14h) of a subgroup have carrier blocks 17 each having a single arm 19 extending either right or left toward the adjacent carrier block 17. For instance, carrier block 17 of carrier assembly 14a is on the left end of the left subgroup, and it has a single right arm 19 to cooperate with a left arm 19 extending from the adjacent carrier block 17 of carrier assembly 14b. The internal carrier assemblies 14 have an adjacent carrier assembly 14 on both the left side and right side (e.g. 14b, 14c, 14f and 14g). Each of the carrier blocks 17 of the internal carrier assemblies has a left arm 19 and a right arm 19 with grabbers to cooperate with the arms 19 of adjacent carrier blocks 17 of the same subgroup on each side. In other words, each carrier block 17 (other than those on the end of a pick-and-place subgroup) includes a right arm extending laterally therefrom towards its adjacent carrier block 17 to the right, and a left arm 19 extending laterally therefrom towards its adjacent carrier block 17 to the left, except those carrier blocks 17 on the end of a sub-group have only one arm 19, extending towards their only adjacent carrier block 17. Each arm 19 may be a single extending piece as seen in FIGS. 1-11, two extending pieces as seen in FIGS. 12A-12C, or multiple extending pieces (not shown). The arms 19 and grabbers 21 are configured such that when a directly-connected carrier assembly 14 and its arm 19 with grabber 21 moves laterally away from a cooperating arm 19 with grabber 21 of an adjacent cooperating carrier assembly 14 (which is a non-connected carrier assembly on end effector 10) in the same subgroup, the moving arm 19 with grabber slides along the cooperating arm with grabber 21 until the moving grabber 21 bears against the cooperating grabber 21, and then the moving arm 19 with grabber 21 pulls the cooperating arm with grabber 21 (and its corresponding carrier assembly 14) in the direction of the moving arm 19 with grabber 21. This describes the actuation when the carrier assemblies 14 are being actuated in a diverging motion from a converged position (see FIGS. 2, 3, 5, 6 and 8) to a diverged position (see FIGS. 1, 4, and 7). When the directly-connected carrier assembly 14 is moved in the opposite direction (i.e. from the diverged position shown in FIGS. 1, 4 and 7 to the converged position shown in FIGS. 2, 3, 5, 6 and 8), the moving arm 19 with grabber 21 of the directly-connected carrier assembly 14 slides along the cooperating arm 19 with grabber 21 of the non-connected carrier assembly 14. As the moving arm 19 with grabber 21 and the cooperating arm 19 with grabber approach the respective adjacent carrier blocks 17, the moving arm 19 with grabber 21 advances into the slot 62 of the cooperating carrier block 17 and the cooperating arm 19 with grabber 21 advances into the slot 62 of the moving carrier block 17 until the moving carrier block 17 contacts the cooperating carrier block. This position of the carrier assemblies is shown in FIGS. 5 and 6, and may be considered the converged position, or alternatively, a partially converged position, depending on the desired pitch in the converged position. Continued movement of the moving carrier block 17 pushes the cooperating carrier block 17 to a further converged position, until the cooperating carrier block 17 contacts the adjacent carrier block 17 on side opposite the moving carrier block 17, in which case, a fully converged position of the carrier assemblies 14 is attained.

The carrier blocks 17 may be constructed of material same or similar to the racks 35 and pinion 56. Each carrier block 17 may be molded as a single-piece, including the body, arms 17, grabbers 19, and pick-up-member housing 64. Each carrier block 17 hosts one or more pick-up members 15 (e.g., suction cups). The carrier blocks 17 are slidingly engaged with the frame 12 and configured for longitudinal sliding movement along the frame 12. However, in some embodiments, some carrier assemblies 14 may be fixed to the frame 12 for specific applications such that those fixed carrier assemblies 14 do not move relative to the frame 12. Each arm 19 has a grabber 21 configured to hook onto the grabber 21 of an arm from its adjacent carrier block 17. The grabbers 21 may be in the form of oppositely oriented fingers at the end of the arms 19, as seen in the figures, for instance FIGS. 7 and 8. For example, the grabber 21 on the arm 21 of one carrier block 17 may be pointed vertically upward, while the grabber 21 on the arm 19 of an adjacent carrier block 17 may be pointed vertically downward, as seen in FIGS. 7 and 8.

FIGS. 7 and 8 show a side view of the end effector 10 and the carrier assemblies 14. The carrier vacuum ports 44 on each of the carrier blocks 17 can be seen. The carrier blocks 17 each have a frame guide 66 which is slidingly received in the frame groove 11 to slidingly couple the carrier assemblies 14 to the frame 12. The carrier blocks 17 each have a carrier slot 62 above the pick-up member housing 64 just below the frame guide 66. The carrier slot 62 is configured to receive the arm(s) 19 of adjacent carrier blocks 17 during convergence. The arms 19 of the internal carrier blocks 17 are offset such that the right arm and left arm of the carrier block offset, i.e., one extends from the front of the slot and one extends from the back of the slot. ("Front" and "back" are used as relative terms relative to the "right" and "left" terms used to describe the direction of movement of the carrier blocks longitudinally along the frame, corresponding to the "right" and "left" arms of the carrier blocks.) The offset allows two arms 19 to be received in the carrier slot 62 at the front—one from the carrier block 17 itself, and one from an adjacent carrier block 17—and two arms 19 to be received in the slot at the back—one from the carrier block 17 itself, and one from an adjacent carrier block 17, during convergence. Similarly, arms 19 on one carrier block 17 extend outward (left and/or right) from the roof or upper edge of the carrier slot 62, whereas the arms 19 of an adjacent carrier block 17 in the same subgroup extend outward from the floor or bottom of the carrier slot 62. This further allows the cooperating arms 19 to glide or slide over/under each other during convergence and divergence, as seen in FIGS. 7 and 8.

The carrier assemblies 14 are positioned for pick and place based on programming of the robot according to the position of the pick and place objects in the "pick" position and the "place" position. Typically, the "pick position" has the objects in a uniform array, such as in the present example, two rows of objects with each row spaced at the diverged spacing of the carrier assemblies 14 (see FIGS. 1, 4 and 7). The "place" phase of the pick-and-place operation requires the carrier assemblies 14 (with items secured to the pick-up members) to be positioned into subgroups, typically at a pitch smaller than (or otherwise different from) that at which the pick-up members "picked" the items. Thus, the "place position" may have two subgroups of 4 on each side of the end effector 10, in which the rows are spaced at the converged spacing of the carrier assemblies 14 (see FIGS. 2, 3, 5, 6 and 8). For example, if the items are to be placed in 2 groups of 4, the carrier assemblies 14 will be positioned such that each side of the end effector 10 (right and left) has 2 subgroups of 4 pick-up members each (referred to herein as 4×4, 4 by 4, or 4-4).

FIGS. 12A, 12B and 12C show an alternative configuration for carrier blocks 17a using arms 19a instead of the arms 19 described above. The arms 19a include multiple extension arms and grabbers 21 instead of the single arm 19 and grabber 21, of the carrier blocks 17 described above. Otherwise, the carrier blocks 17 are the same or substantially similar to the carrier blocks 17, the description above applies equally to the carrier blocks 17, where applicable. FIG. 12A shows the carrier assemblies 14 as separate parts. FIG. 12B shows the carrier assemblies 14 in a diverged position with the grabbers 21 in an engaged position. FIG. 12B shows the carrier assemblies 14 in a partially converged position with the grabbers 21 disengaged and the arms 19a extending into the carrier slots 62 of the adjacent carrier blocks 17.

The operation of the end effector 10 will now be described with reference to the figures. It is understood that the end effector 10 is to be attached to a robot by attaching an interface member of the robot to the connector plate 26, and connecting the robot's rotatable shaft to the top end (robot shaft interface) of the spindle shaft of the spindle assembly 52 of the rack and pinion assembly 50. A vacuum source is also connected to the input vacuum ports 40 using suitable tubing. In addition, tubes (not shown) are connected between the distribution vacuum ports 42 and each of the carrier vacuum ports 44 of the carrier assemblies 14. The robot is activated and controls the movement of the entire end effector 10, as well as controlling the position of the carrier assemblies 14 by controlling the position of the spindle shaft via the position of the robot's rotatable shaft).

Starting with the carrier assemblies 14 in the diverged position as shown in FIG. 1, the robot positions the end effector 10 over the objects to be picked up with each of the pick-up members 15 above and/or against the objects to be picked. The robot activates the vacuum source (such as be opening a valve) which creates a vacuum at each of the pick-up members 15 via vacuum air flow through the pathway as described above. The vacuum at each of the pickup members 15 causes the objects to be picked up by the pick-up members, and then the robot moves the end effector 10 to a place location where the picked up objects will be placed. While the end effector 10 is being moved and/or when it reaches the place location, the robot actuates the end effector 10 to move the carrier assemblies 14 to a converged position for placing the objects at the desired pitch.

Referring to FIG. 1, the robot rotates the robot's rotatable shaft in a clockwise direction (looking down on the end effector 10), thereby rotating the spindle shaft and the pinion 56 in a clockwise direction. The clockwise rotation of the pinion gear drives the racks 35 to move linearly, with the left rack 35 moving backward (into the page according to the orientation of FIG. 1) and the right rack 35 moving forward (out of the page according to the orientation of FIG. 1). The movement of the racks 35 cause the actuation rods 48 to move in the same direction as their corresponding rack 35, which causes the directly connected carrier assemblies 14*a*, 14*e*, 14*d*, and 14*h* to move in synch with their corresponding actuation rods 48. In other words, carrier assemblies 14*a* and 14*e* move backward towards their corresponding adjacent carrier assemblies 14*b* and 14*f*, respectively; and carrier assemblies 14*d* and 14*h* move forward towards their corresponding adjacent carrier assemblies 14*c* and 14*g*, respectively.

Figure 2:
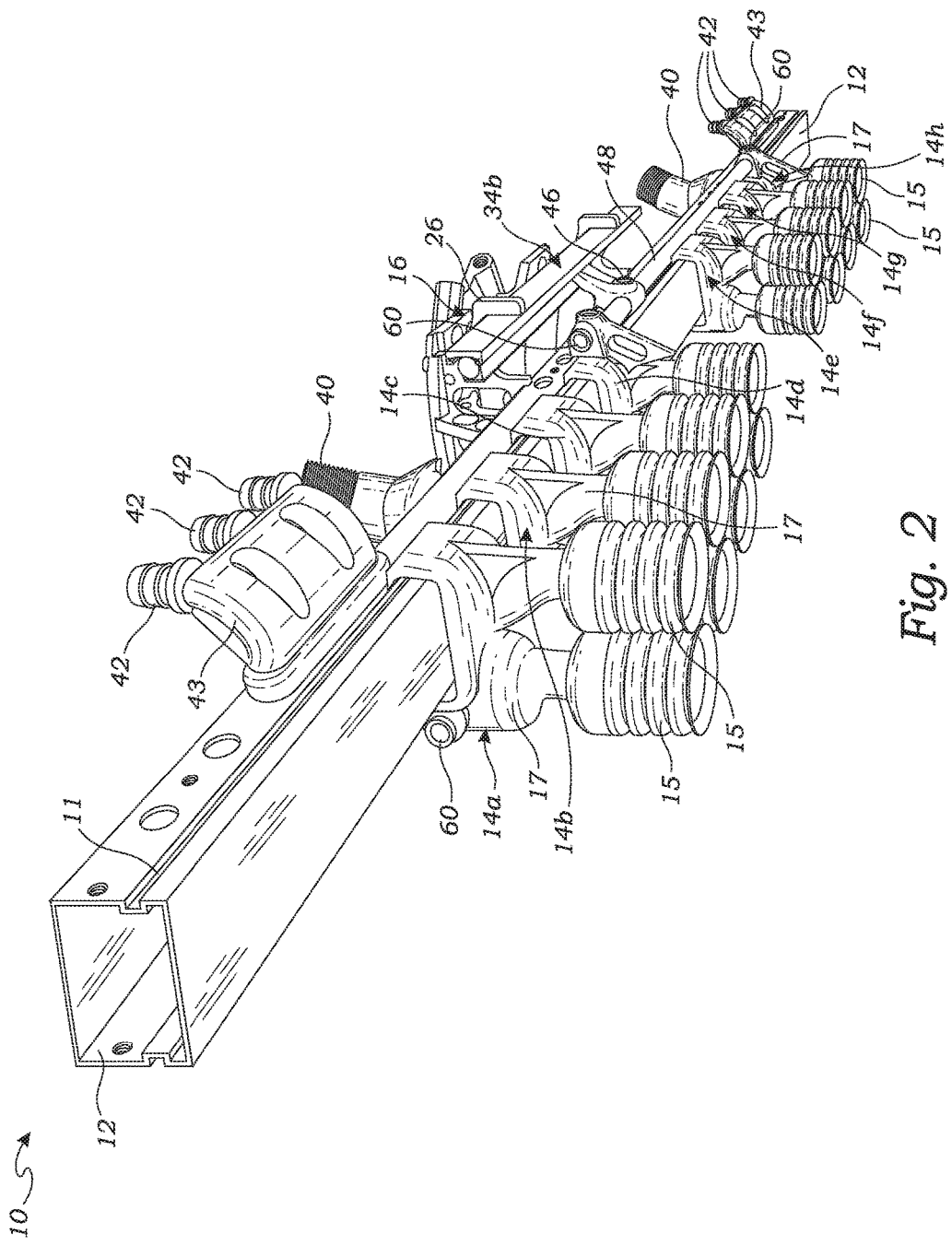
FIG. 2 is a bottom perspective view of the end effector of FIG. 1, with the carrier assemblies in a converged position, according to one embodiment of the present invention.
Figure 3:
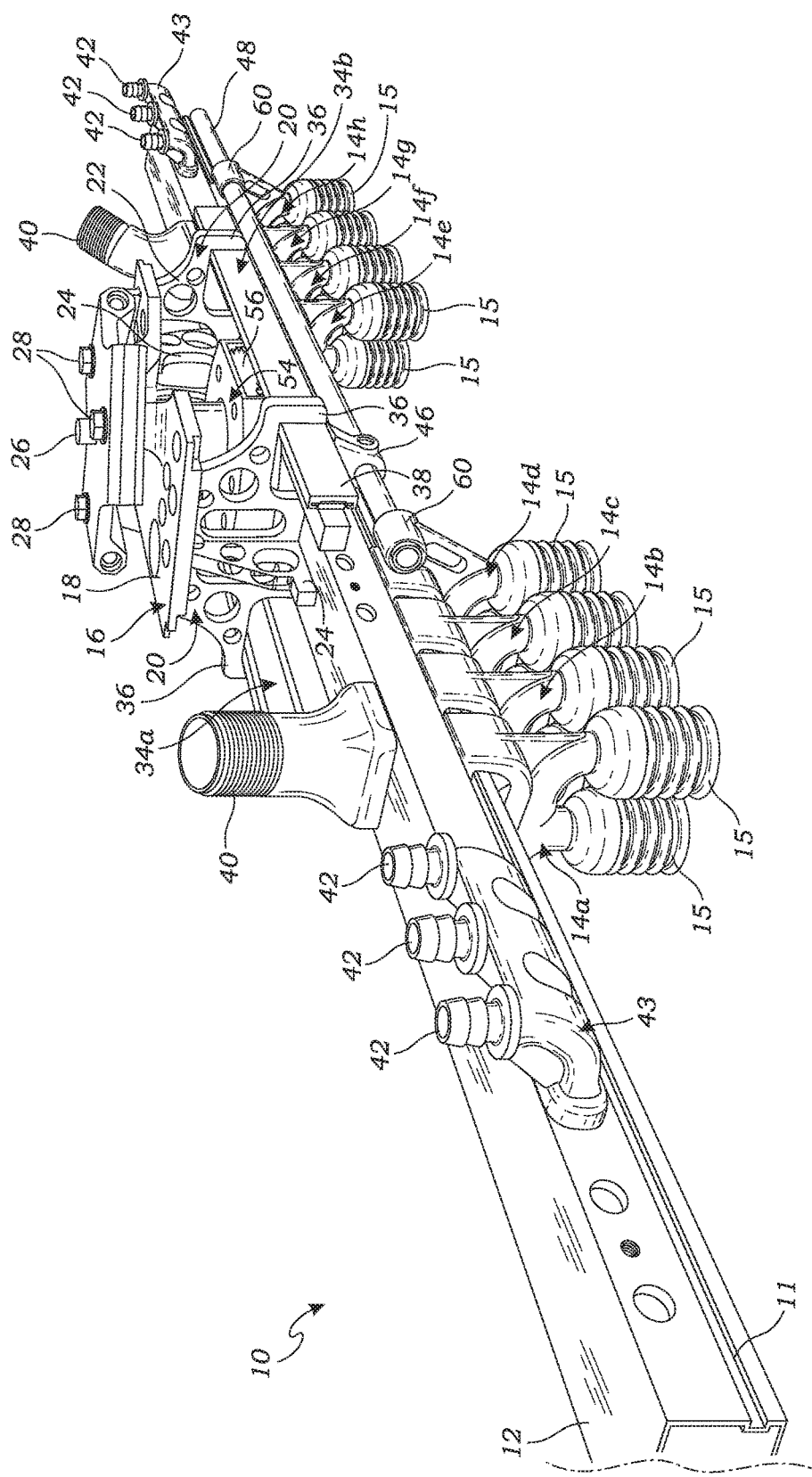
FIG. 3 is a top perspective view of the right side of the end effector of FIG. 1, with the carrier assemblies in a converged position, according to one embodiment of the present invention.
Figure 4:
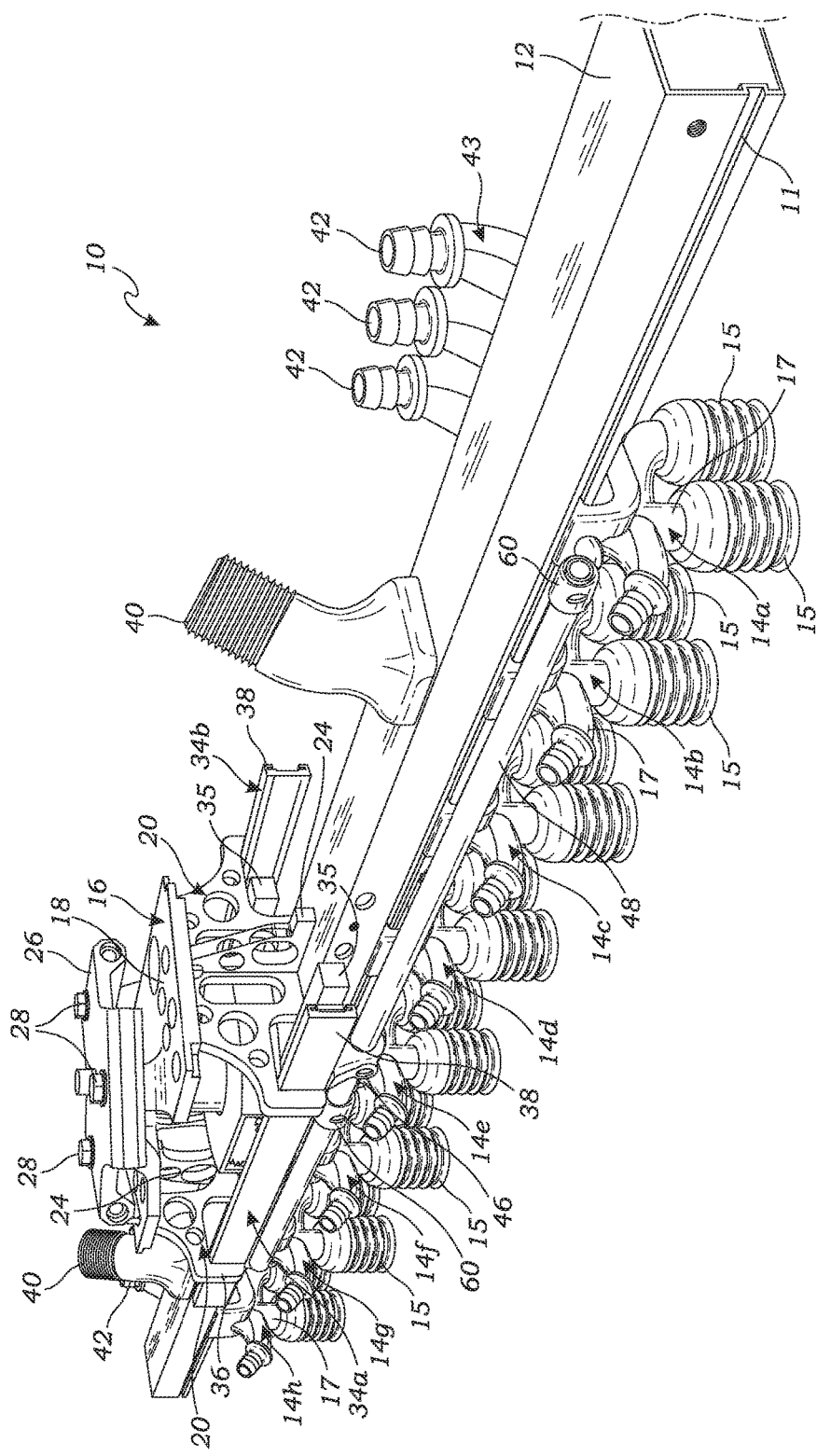
FIG. 4 is a top perspective view of the right side of the end effector of FIG. 1, with the carrier assemblies in a diverged position, according to one embodiment of the present invention

Depending on the desired pitch for the place position, the robot's shaft may actuate the movement of the carrier assemblies 14 to the position where the directly connected carrier assemblies 14 just come into contact with the non-connected carrier assemblies 14 as shown in FIGS. 5, 6 and 8, or it may actuate them into a further converged position in which the directly connected carrier assemblies 14 bear against the non-connected carrier assemblies 14 and move them to a further converged position, as shown in FIGS. 2 and 3. When the end effector 10 is positioned in the place position and the carrier assemblies 14 are actuated to the desired place pitch, the robot de-actuates the vacuum (such as by closing a valve to the vacuum source), causing the pick-up members 15 to release the objects at the place position.

The robot then moves the end effector 10 to a position to pick up more objects, and at the same time moves the carrier assemblies 14 back to the diverged position. The robot rotates the robot's rotatable shaft in a counter-clockwise direction (looking down on the end effector 10), thereby rotating the spindle shaft and the pinion 56 in a counter-clockwise direction. The c counter-clockwise rotation of the pinion gear drives the racks 35 to move linearly, with the left rack 35 moving forward (out the page according to the orientation of FIG. 1) and the right rack 35 moving backward (out of the page according to the orientation of FIG. 1). The movement of the racks 35 cause the actuation rods 48 to move in the same direction as their corresponding rack 35, which causes the directly connected carrier assemblies 14*a*, 14*e*, 14*d*, and 14*h* to move in synch with their corresponding actuation rods 48. In other words, carrier assemblies 14*a* and 14*e* move forward away from their corresponding adjacent carrier assemblies 14*b* and 14*f*, respectively; and carrier assemblies 14*d* and 14*h* move backward away their corresponding adjacent carrier assemblies 14*c* and 14*g*, respectively, until the carrier assemblies are position in the desired diverged position for the pick position. The process may then be repeated as required.

The end effector 10 may also be configured to work in connection with other actuation mechanisms and/or other carrier movement mechanisms besides the rack and pinion actuation mechanism, including rotary cams and cam blocks and/or tie links, as described, e.g., in Subotincic, which is incorporated by reference above.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

What is claimed is:
1. An end effector comprising:
   a frame having an elongated frame groove extending along a first axis of the frame;
   a first carrier assembly having a first carrier block with a first frame guide slidingly received in the frame groove allowing the first carrier assembly to slidingly move along the first axis, the first carrier block having a first slot disposed adjacent the first frame guide;
   a second carrier assembly comprising a second carrier block having a second frame guide slidingly received in the frame groove allowing the second carrier assembly to slidingly move along the first axis, the second carrier assembly disposed adjacent the first carrier assembly; the second carrier block having a second slot disposed adjacent the second frame guide;
   the first carrier assembly comprising a first arm having a first grabber and extending laterally towards the second carrier assembly such that the first arm is received in the second slot when the first carrier assembly and second carrier assembly converge toward each other,
   the second carrier assembly comprising a second arm having a second grabber configured to engage the first grabber and extending laterally towards the first carrier assembly such that the second arm is received in the first slot when the first carrier assembly and second carrier assembly converge toward each other.
2. The end effector of claim 1, further comprising a vacuum port configured for connection to a vacuum source via a flexible tube.
3. The end effector of claim 1, further comprising a first actuation device operably attached to the first carrier assembly and configured to move the first carrier assembly in a reciprocating motion along the first axis.
4. The end effector of claim 3, wherein the first actuation device comprises a first actuation rod having a first portion operably coupled to the first carrier assembly and a second portion operably coupled to a driving mechanism configured to move the first actuation rod in a reciprocating motion.

5. The end effector of claim 4, wherein the driving mechanism comprises a rack and pinion assembly comprising a rack slidably coupled to the frame and a pinion operably engaged with the rack such that rotational movement of the pinion causes linear movement of the rack and of a spindle assembly, the spindle assembly having a first end operatively connected to the pinion assembly, and a second end configured to operably couple to a rotating shaft of a robot.

6. The end effector of claim 5, further comprising a connector plate configured to connect the end effector to the robot.

7. The end effector of claim 5, further comprising a rack rail fixedly mounted to the frame, and wherein the rack is slidingly engaged with the rack rail.

8. The end effector of claim 7, further comprising a connector plate configured to connect the end effector to the robot.

9. The end effector of claim 8, further comprising a vacuum port configured for connection to a vacuum source via a flexible tube.

10. The end effector of claim 1, wherein the first grabber comprises a first hook depending from the first arm and the second grabber comprises a second hook depending from the second arm, and wherein the first hook and second hook are oppositely oriented such that when the first carrier assembly is slidingly moved longitudinally along the frame a sufficient distance away from the second carrier assembly, the first hook couples to the second hook thereby limiting the longitudinal movement of the first carrier assembly.

11. An end effector comprising:
a frame having an elongated frame groove extending along a first axis of the frame;
a first carrier assembly having a first carrier block with a first frame guide slidingly received in the frame groove allowing the first carrier assembly to slidingly move along the first axis, the first carrier block having a first slot disposed adjacent the first frame guide;
a second carrier assembly comprising a second carrier block having a second frame guide slidingly received in the frame groove allowing the second carrier assembly to slidingly move along the first axis, the second carrier assembly disposed adjacent the first carrier assembly; the second carrier block having a second slot disposed adjacent the second frame guide;
a third carrier assembly comprising a third carrier block having a third frame guide slidingly received in the frame groove allowing the third carrier assembly to slidingly move along the first axis, the third carrier assembly disposed adjacent the second carrier assembly; the third carrier block having a third slot disposed adjacent the third frame guide;
a fourth carrier assembly comprising a fourth carrier block having a fourth frame guide slidingly received in the frame groove allowing the fourth carrier assembly to slidingly move along the first axis, the fourth carrier assembly disposed adjacent the third carrier assembly; the fourth carrier block having a fourth slot disposed adjacent the fourth frame guide;
the first carrier assembly comprising a first arm having a first grabber and extending laterally towards the second carrier assembly such that the first arm is received in the second slot when the first carrier assembly and second carrier assembly converge toward each other, the second carrier assembly comprising a second arm having a second grabber configured to engage the first grabber and extending laterally towards the first carrier assembly such that the second arm is received in the first slot when the first carrier assembly and second carrier assembly converge toward each other,
the third carrier assembly comprising a third arm having a third grabber and extending laterally towards the second carrier assembly such that the third arm is received in the fourth slot when the second carrier assembly and third carrier assembly converge toward each other, and
the fourth carrier assembly comprising a fourth arm having a fourth grabber configured to engage the third grabber and extending laterally towards the third carrier assembly such that the fourth arm is received in the third slot when the third carrier assembly and fourth carrier assembly converge toward each other.

12. The end effector of claim 11, further comprising a vacuum port configured for connection to a vacuum source via a flexible tube.

13. The end effector of claim 11, further comprising:
a first actuation device operably attached to the first carrier assembly and configured to move the first carrier assembly in a reciprocating motion along the first axis; and
a second actuation device operably attached to the fourth carrier assembly and configured to move the fourth carrier assembly in a reciprocating motion.

14. The end effector of claim 13, wherein:
the first actuation device comprises a first actuation rod having a first portion operably coupled to the first carrier assembly and a second portion operably coupled to a driving mechanism configured to move the first actuation rod in a reciprocating motion; and
the second actuation device comprises a second actuation rod having a first portion operably coupled to the fourth carrier assembly and a second portion operably coupled to the driving mechanism configured to move the second actuation rod in a reciprocating motion.

15. The end effector of claim 14, wherein:
the driving mechanism comprises 1) a rack and pinion assembly comprising a first rack slidably coupled to the frame, a second rack slidably coupled to the frame, and a pinion operably engaged with the first rack and the second rack such that rotational movement of the pinion causes linear movement of the first rack and the second rack, and 2) a spindle assembly having a first end operatively connected to the pinion assembly, and a second end configured to operably couple to a rotating shaft of a robot.

16. The end effector of claim 15, further comprising a connector plate configured to connect the end effector to the robot.

17. The end effector of claim 15, further comprising:
a first rack rail fixedly mounted to the frame, the first rack slidingly engaged with the first rack rail; and
a second rack rail fixedly mounted to the frame, the second rack slidingly engaged with the second rack rail.

18. The end effector of claim 17, further comprising a connector plate configured to connect the end effector to the robot.

19. The end effector of claim 18, further comprising a vacuum port configured for connection to a vacuum source via a flexible tube.

20. The end effector of claim 11, wherein:
the first grabber comprises a first hook depending from the first arm and the second grabber comprises a second hook depending from the second arm, and wherein the first hook and second hook are oppositely oriented such that when the first carrier assembly is slidingly moved longitudinally along the frame by the first actuation device a sufficient distance away from the second carrier assembly, the first hook couples to the second hook thereby limiting the longitudinal movement of the first carrier assembly; and
the fourth grabber comprises a fourth hook depending from the fourth arm and the third grabber comprises a third hook depending from the third arm, and wherein the fourth hook and third hook are oppositely oriented such that when the fourth carrier assembly is slidingly moved longitudinally along the frame by the second actuation device a sufficient distance away from the third carrier assembly, the fourth hook couples to the third hook.

\* \* \* \* \*